(12) United States Patent
Mortensen et al.

(10) Patent No.: US 10,821,505 B2
(45) Date of Patent: Nov. 3, 2020

(54) SMALL-SCALE METAL CASTINGS, SMALL-SCALE METAL/TRANSPARENT COMPOSITE STRUCTURES, AND PROCESS TO PRODUCE THE SAME

(71) Applicant: ECOLE POLYTECHNIQUE FEDERALE DE LAUSANNE (EPFL), Lausanne (CH)

(72) Inventors: Andreas Mortensen, Saint-Saphorin-sur-Morges (CH); Yves Bellouard, Lutry (CH); Raphaël Charvet, Moudon (CH); Cyril Dénéréaz, Chessel (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 239 days.

(21) Appl. No.: 15/768,019

(22) PCT Filed: Nov. 10, 2016

(86) PCT No.: PCT/IB2016/056770
§ 371 (c)(1),
(2) Date: Apr. 13, 2018

(87) PCT Pub. No.: WO2017/081635
PCT Pub. Date: May 18, 2017

(65) Prior Publication Data
US 2018/0304352 A1    Oct. 25, 2018

(30) Foreign Application Priority Data

Nov. 10, 2015 (WO) .................. PCT/IB2015/058683

(51) Int. Cl.
*B22D 19/00* (2006.01)
*B22D 18/00* (2006.01)
(Continued)

(52) U.S. Cl.
CPC ......... *B22D 19/0081* (2013.01); *B22D 17/00* (2013.01); *B22D 18/00* (2013.01);
(Continued)

(58) Field of Classification Search
CPC .... B22D 19/00; B22D 19/0081; B22D 17/00; B22D 18/00; B22D 27/04; B22D 27/045; B22D 27/15
(Continued)

(56) References Cited

U.S. PATENT DOCUMENTS 5,163,499 A * 11/1992 Newkirk et al. ...... C04B 35/652
164/108
5,529,109 A * 6/1996 Dwivedi et al. ........ C04B 41/51
164/97
6,148,899 A    11/2000 Cornie et al.

FOREIGN PATENT DOCUMENTS

WO    WO 9938630 A    8/1999
WO    WO 0115819 A1    3/2001

OTHER PUBLICATIONS

Baltes et al., "Microengineering of Metals and Ceramics: Part I: Design, Tooling and Injection Molding;.vol. 3: Advanced Micro & Nanosystems. Microengineering of Metals and Ceramics: Part I: Design, Tooling and Injection Molding; vol. 3: Advanced Micro & Nanosystems," ISBN 3-527-31208-0. Wiley, Sep. 2005, pp. 357-393.

(Continued)

*Primary Examiner* — Kevin P Kerns
(74) *Attorney, Agent, or Firm* — Andre Roland S.A.; Nikolaus Schibli

(57) ABSTRACT

A method including the steps of exposing a substrate to focused laser irradiation at a preselected series of locations that trace a subset of the substrate volume that is connected to the surface of the substrate, removing the substrate material from the exposed preselected series of locations to (Continued)

create within the substrate at least one cavity that is connected to the surface of the substrate, immersing the cavity-containing substrate in an appropriate atmosphere such as a selected gas or vacuum and, within this atmosphere, contacting the substrate surface with the molten castable material surface at locations where the cavity or cavities emerges from the substrate, applying pressure to the castable material to cause it to infiltrate the substrate cavities, and solidifying the castable material within the cavities.

19 Claims, 15 Drawing Sheets

(51) Int. Cl.
  *B22D 27/04*    (2006.01)
  *B22D 27/15*    (2006.01)
  *C03C 23/00*    (2006.01)
  *C04B 41/88*    (2006.01)
  *C03C 15/00*    (2006.01)
  *C03C 17/10*    (2006.01)
  *C04B 41/51*    (2006.01)
  *B23K 26/0622*    (2014.01)
  *B23K 26/55*    (2014.01)
  *B22D 17/00*    (2006.01)
  *C03C 17/22*    (2006.01)
  *C04B 41/00*    (2006.01)
  *B23K 103/00*    (2006.01)
  *C04B 111/80*    (2006.01)
  *B23K 101/36*    (2006.01)

(52) U.S. Cl.
  CPC ........... *B22D 19/00* (2013.01); *B22D 27/045* (2013.01); *B22D 27/15* (2013.01); *B23K 26/0624* (2015.10); *B23K 26/55* (2015.10); *C03C 15/00* (2013.01); *C03C 17/10* (2013.01); *C03C 17/22* (2013.01); *C03C 23/0025* (2013.01); *C04B 41/009* (2013.01); *C04B 41/51* (2013.01); *C04B 41/88* (2013.01); *B23K 2101/36* (2018.08); *B23K 2103/52* (2018.08); *B23K 2103/54* (2018.08); *C04B 2111/805* (2013.01)

(58) Field of Classification Search
  USPC .......................................... 164/91, 98, 122.1
  See application file for complete search history.

(56) References Cited

OTHER PUBLICATIONS

Baumeister, G., Buqezi-Ahmeti, D., Glaser, J., & Ritzhaupt-Kleissl, H. J. (2011). New approaches in microcasting: permanent mold casting and composite casting. Microsystem Technologies, 17(2), 289-300.

Bellouard, Y., Said, A. A., & Bado, P. (2005). Integrating optics and micro-mechanics in a single substrate: a step toward monolithic integration in fused silica. Optics Express, 13(17), 6635-6644.

Bellouard, Y., Said, A., Dugan, M., & Bado, P. (2004). Fabrication of high-aspect ratio, micro-fluidic channels and tunnels using femtosecond laser pulses and chemical etching. Optics express, 12(10), 2120-2129.

Buqezi-Ahmeti, D., Maisenbacher, J., Gibmeier, J., & Hanemann, T. (2013). Metal-ceramic-composite casting of complex micro components. Microsystem technologies, 19(2), 159-165.

Chen, F., Shan, C., Liu, K., Yang, Q., Meng, X., He, S., . . . & Hou, X. (2013). Process for the fabrication of complex three-dimensional microcoils in fused silica. Optics letters, 38(15), 2911-2914.

Cheng, Y., Sugioka, K., & Midorikawa, K. (2004). Microfluidic laser embedded in glass by three-dimensional femtosecond laser microprocessing. Optics letters, 29(17), 2007-2009.

He, S., Chen, F., Yang, Q., Liu, K., Shan, C., Bian, H., . . . & Hou, X. (2012). Facile fabrication of true three-dimensional microcoils inside fused silica by a femtosecond laser. Journal of Micromechanics and. Microengineering, 22(10), 105017.

Hunt, A. J. (2011). Nanomorphing with Ultrafast Lasers and Biomedical Applications. MRS Online Proceedings Library Archive, 1365.

International Search Report of PCT/IB2015/058683 dated Jul. 7, 2016.

International Search Report of PCT/IB2016/056770 dated Feb. 15, 2017.

Ivanov, T., Bührig-Polaczek, A., Vroomen, U., Hartmann, C., Holtkamp, J., Gillner, A., . . . & Theiss, S. (2011). Replication of specifically microstructured surfaces in A356-alloy via lost wax investment casting. Journal of Micromechanics and Microengineering, 21(8), 085026.

Juodkazis, S., Nishi, Y., & Misawa, H. (2008). Femtosecond laser-assisted formation of channels in sapphire using KOH solution. physica status solidi (RRL)-Rapid Research Letters, 2(6), 275-277.

Lenssen, B., & Bellouard, Y. (2012). Optically transparent glass micro-actuator fabricated by femtosecond laser exposure and chemical etching. Applied Physics Letters, 101(10), 103503.

Liao, Y., Song, J., Li, E., Luo, Y., Shen, Y., Chen, D., . . . & Midorikawa, K. (2012). Rapid prototyping of three-dimensional microfluidic mixers in glass by femtosecond laser direct writing. Lab on a Chip, 12(4), 746-749.

Liu, K., Yang, Q., Zhao, Y., Chen, F., Shan, C., Fan, X., . . . & Bian, H. (2013). Fabrication and analytical evaluation of three-dimensional microsolenoids achieved in fused silica by femtosecond-laser-based microsolidifying process. Micro & Nano Letters, 8(10), 623-628.

Liu, K., Yang, Q., Zhao, Y., Chen, F., Shan, C., He, S., . . . & Bian, H. (2014). Three-dimensional metallic microcomponents achieved in fused silica by a femtosecond-laser-based microsolidifying process. Microelectronic Engineering, 113, 93-97.

Matsuo, S., Iwasa, K., Tomita, T., Hashimoto, S., & Okada, T. (2011). Femtosecond laser-assisted etching of fluoride crystals. Journal of Laser Micro Nanoengineering, 6(3), 245-248.

Matsuo, S., Sumi, H., Kiyama, S., Tomita, T., & Hashimoto, S. (2009). Femtosecond laser-assisted etching of Pyrex glass with aqueous solution of KOH. Applied Surface Science, 255(24), 9758-9760.

Meng, X., et al."Fabrication of 3D solenoid microcoils in silica glass by femtosecond laser wet etch and microsolidics." International Conference on Photonics and Optical Engineering (icPOE 2014) (vol. 9449, p. 94493N). International Society for Optics and Photonics.

Meng, X., Yang, Q., Chen, F., Shan, C., Liu, K., & Hou, X. (2015). Fabrication of three-dimensional micro-Rogowski coil based on femtosecond laser micromachining. Applied Physics A, 120(2), 669-674.

Meng, X., Yang, Q., Chen, F., Shan, C., Liu, K., Li, Y, . . . & Hou, X. (2016). Three dimensional multilayer solenoid microcoils inside silica glass. Optics & Laser Technology, 76, 29-32.

Mortensen, A. (2000). Melt infiltration of metal matrix composites. Comprehensive composite materials, 3(LMM-Chapter-2000-001), 521-524.

Rögner, J., Lang, K. H., Baumeister, G., & Schulze, V. (2011). Microstructure and mechanical properties of micro tensile specimens made of CuAl10Ni5Fe4 produced by micro casting. Microsystem Technologies, 17(2), 301-311.

S. Kiyama, S. Matsuo, S. Hashimoto, and Y. Morihira, "Examination of Etching Agent and Etching Mechanism on Femotosecond Laser Microfabrication of Channels Inside Vitreous Silica Substrates†," The Journal of Physical Chemistry C 113, 11560-11566 (2009).

Shan, C., Chen, F., Yang, Q., Li, Y., Bian, H., Yong, J., & Hou, X. (2015). High-level integration of three-dimensional microcoils array in fused silica. Optics letters, 40(17), 4050-4053.

(56) References Cited

OTHER PUBLICATIONS

Simmonds, R. D., Salter, P. S., Jesacher, A., & Booth, M. J. (2011). Three dimensional laser microfabrication in diamond using a dual adaptive optics system. Optics express, 19(24), 24122-24128.
Written Opinion of PCT/IB2015/058683 of the International Search Authority dated Jul. 7, 2016.
Written Opinion of PCT/IB2016/056770 of the International Search Authority dated Feb. 15, 2017.
www.femtoprint.ch.
Yang, C., Li, B. S., Ren, M. X., & Fu, H. Z. (2010). Studies of microstructures made of Zn—Al alloys using microcasting. The International Journal of Advanced Manufacturing Technology, 46(1-4), 173-178.
Yang, T., & Bellouard, Y. (2015). Monolithic transparent 3D dielectrophoretic micro-actuator fabricated by femtosecond laser. Journal of Micromechanics and Microengineering, 25(10), 105009.

\* cited by examiner

SMALL-SCALE METAL CASTINGS, SMALL-SCALE METAL/TRANSPARENT COMPOSITE STRUCTURES, AND PROCESS TO PRODUCE THE SAME

CROSS REFERENCE TO RELATED APPLICATIONS

The present application is a United States national stage application of International patent application PCT/IB132016/056770 filed on Nov. 10, 2016 designating the United States, and claims foreign priority to International patent application PCT/IB132015/058683 filed on Nov. 10, 2015, the contents of both documents being herewith incorporated by reference in their entirety.

FIELD OF THE INVENTION

The present invention relates to the production of three-dimensional micrometric objects that combine in pre-determined geometric patterns (i) a material that can be melted and cast with (ii) a second, transparent to a given laser wavelength, material that has a higher melting point than the cast material. It can also be used to produce parts of the cast material having a pre-determined and complex shape to tolerances well below a micrometre.

More specifically, the present invention relates to materials that are transparent to lasers, such as glass or sapphire, and to castable materials of engineering significance, such as copper or silver, that are durable, economical, and can serve in specific functions such as, but not limited to, the conduction of electricity. As a result, the present invention can produce a wide range of engineering structures and devices of use in various engineering applications, for example in electronics, MEMS, micromechanics, or microfluidics.

BACKGROUND OF THE INVENTION

It is known that ultrashort laser pulses (such as pulses well below one nanosecond, for example in the picosecond or femtosecond range) can induce non-linear absorption effects in the bulk of transparent materials, causing local structural modifications. In the present context, transparent materials refer to materials for which the ultrashort laser pulses emitted at a given wavelength can travel through without being completely absorbed (i.e. the energy transmitted remains above 10% after passing through the material). These modifications can be exploited to produce hollow cavities of pre-programmed shape and geometrical distribution. It is known that non-linear laser matter interactions can produce features smaller than the laser wavelength itself and the diffraction limit.

An illustration of a laser-based process which produces cavities and channels in fused silica is thoroughly described in reference [14]. There, a femtosecond laser emitting 100 fs pulses is used to modify the internal structure of glass. The region exposed to the laser is shaped according to a pre-defined, arbitrary and complex geometry, and is then selectively dissolved in a low-concentration hydrofluoric acid. This leaves a network of micrometric cavities of arbitrary shape within the fused silica, which can serve in a variety of applications, microfluidic devices being one example of such applications.

Aspect ratios are typically on the order to 1 to 100 when using HF, but as demonstrated in reference [15] aspect ratios can span a wider range, from 1 to 2000, if KOH is used as an etchant. These limitations to the technology are not fixed, and are likely to evolve in time.

Variations of the same process applied on other glass variants such as photosensitive glass Foturan™ for instance see reference [16], Borosilicate see reference [20], Pyrex™ see reference [17], as well as crystals such as sapphire see reference [19], Calcium-fluoride see reference [18] or diamond see reference [23] have also been successfully demonstrated to produce microscale cavities. In some cases however, for example with photosensitive glass such as Foturan™, an annealing step is required prior to the etching step.

This list is non-exhaustive and characteristics given above are non-limitative as it is known that non-linear absorption effects can be induced in any transparent material. Interconnected cavities of essentially any shape can be formed in essentially any transparent material, provided a proper etchant, or another equivalent method, is found to remove the laser-exposed volume within the material.

Cavities may also be created using non-linear absorption at higher energies, which leads to locally ablate the material in its volume. There, no additional etching step is needed. Using this method, cavities are formed by juxtaposing ablation sites and by evacuating debris from laser-induced micro-explosions by immersing the material in a water environment see reference [21]. Finally another method to produce cavities using ultrafast lasers is described in reference [22]. The principle is to expose a porous glass (such as nanoporous silica) immersed in a water environment to laser irradiation such that microexplosions occur. The ablated material is thus removed with the water penetrating into the cavities. A final annealing step is used to densify the glass and to remove the pores, leaving only the cavities fabricated with the laser.

By filling such cavities with another material, for example a material that is a good electric conductor or one that has interesting physical properties such as a high-optical gain material, a wide range of new devices may be produced.

This has driven the exploration of ways to produce metal coils in glass: the literature discloses the fabrication of micrometric low melting point metal coils embedded in glass in references [1-6, 27, 28]. In these works, a solenoid-shaped cavity is first carved in glass by a conventional femtosecond laser exposition followed by etching. The cavity is then filled with gallium (melting point 29° C.) or various Bi/In/Sn/Pb alloys (melting points 47, 70, 94 or 125° C.), using an injection/suction set-up, which consists in two syringes sealed to the glass using PDMS, one to inject metal at one end of the channel, while the other syringe removes air at the other end. During metal injection, the device and the metal are held at a temperature slightly above the metal melting temperature. A silinazation pretreatment of the channel surface before metal injection is also reported see references [3, 4], the goal being to ease the injection process by improving wetting of the glass by the metal.

This approach is however limited in four ways:
) firstly, the metal injection method cannot deliver high pressures;
) secondly, the complex tooling required restricts it to low melting point metals and alloys,
) thirdly, it requires through-channels and cannot be applied to blind cavities with a single entry point,
) fourthly, it is not adapted for mass production, as it cannot be easily applied to a substrate having many cavities and injection nozzles.

In a related and ongoing research effort at EPFL (Swiss National Science Foundation Projects 200020-130003, 200020-143963, 200020-156064, PI Andreas Mortensen, http://p3.snf.ch/Project-156064; http://lmm.epfl.ch/page-26927.html) pressure infiltration methods have been extended to produce micrometric cast samples of aluminium, magnesium or their alloys. Here, the metal is shaped by it being injected, using pressure infiltration, into water-soluble moulds. These contain a cavity that was produced by replication of the outer surface of a pattern that can be removed by pyrolysis from a mould into which it was embedded. In its current state, this process uses single crystalline NaCl moulds, which are produced by precipitation in brine around the patterns. Single-crystalline wires of aluminium and several other metals having a melting point below that of NaCl have been produced in this way, the wires having a smooth surface and a diameter down to 6 µm. This process is, however, cumbersome and hence uneconomical, and it is also very limited in the range of shapes that it can produce.

Other, less fine-scale microcasting processes exist; these are reviewed in reference [8] while references [9-13] give examples of more recent contributions. Such microcasting processes are in essence small-scale variants of conventional precision investment casting. They all suffer from a fundamental limitation, namely the fact that conventional moulding materials are polycrystalline and thus present, after heating to casting temperatures, grooves wherever a grain boundary intersects the mould surface: when the metal is cast, it fills such grooves, which represent as many uncontrolled defects in the shape of the casting. This limits the ability of current microcasting processes to produce castings of micrometric dimensions with high surface quality and high shape precision.

Other pressure infiltration processes exist, for example as practiced to produce metal matrix composites; those processes and their underlying fundamentals are reviewed in reference [7]. Publication WO 99/38630 discloses a method for high throughput pressure infiltration typically used in the field of automotive, truck, heavy construction equipment, and outboard motor applications. Metal matrix composite infiltration processes have in common with microcasting the fact that molten metal is forced into small pores; however, in composites the pores are random in shape and are randomly distributed throughout the structure. This leads to important differences between the process of metal matrix composite infiltration and the method disclosed in the present invention.

SUMMARY OF THE INVENTION

An aim of the present invention is to improve the known processes and products. As has been described above, the known methods and devices have certain defects and limitations.

More specifically, an aim of the present invention is to create new types of products such as, for instance, in the field of optics: glass with embedded gain medium or high-refractive index media or metamaterials; in the field of microfluidics: combinations of metal and channels embedded within an insulating material; in the field of micromechanics including watchmaking: for instance to produce tiny castings of shapes that cannot be produced by micromachining or 2D lithography and also transparent materials containing preshaped opaque elements; in the field of energy storage: supercapacitor structures; in the field of high-performance structural applications: examples include energy-absorbing porous structures, or in the field of electronics: examples include glass-sealed micro-wave antennas or dense miniaturized super capacitors.

A further aim of the invention is to alleviate the several limitations of current microscale material processing methods as described hereabove.

In one embodiment, the invention combines ultrashort pulse laser processing with pressure infiltration processing in ways that produce structures of two solid materials, intimately imbricated into one another along three-dimensional pre-programmable geometrical patterns, with good structural integrity and a wide choice of materials and geometries, and of resulting applications.

In one embodiment, an ancillary result of the process is a novel microcasting process, which is free of the limitations of all current microcasting processes.

The present invention teaches powerful and versatile methods that can be used to inject metal, or other castable materials, into tailor-made fine cavities of complex shape produced using ultrafast laser radiation within refractory materials such as glass.

According to some embodiments of the present invention, composite structures in which a substrate transparent to a given laser wavelength is combined with a castable material along a pre-determined geometrical pattern are produced by a novel combination of ultrafast laser processing with pressure infiltration processing.

According to a first embodiment, the present invention relates to a method for casting a castable material in a substrate wherein the substrate remains solid at the castable material casting temperature and can be partially traversed partially traversed or penetrated up to a certain depth by laser wavelengths.

The method may comprise at least the following steps:
- exposing the substrate to focused laser irradiation at a preselected series of locations that trace a subset of the substrate volume that is connected to its surface;
- removing the substrate material from the exposed preselected series of locations to create within the substrate at least one cavity that is connected to its surface;
- immersing the cavity-containing substrate in an appropriate atmosphere such as a selected gas or vacuum and, within this atmosphere,
- contacting the substrate surface with molten castable material surface at locations where the cavity or cavities emerges from the substrate;
- applying pressure to the castable material to cause it to infiltrate the substrate cavities;
- solidifying the castable material within the cavities.

In one embodiment, the substrate volume exposed to laser irradiation is removed for example by laser ablation, or selective etching or flushing using liquid or gas or a combination thereof. Other equivalent methods may be envisaged.

In one embodiment, the substrate is an oxide glass including fused silica, or borosilicate glass, or aluminosilicate glass, or tellurite glass, or germanosilicate glass or a porous glass such as nanoporous or microporous glass. Other equivalent materials/glasses may of course be envisaged.

In one embodiment, the substrate is a laser-transparent crystalline or semi-crystalline ceramic including sapphire, or ruby, or diamond, or a nitride, or a carbide or silicon. Other equivalent materials may of course be envisaged.

In one embodiment, the castable material is a metal or a metal alloy. This includes copper, or silver, or gold, or platinum, or palladium, or aluminium, or magnesium, or zinc, or tin, or nickel, or iron, or titanium, and their alloys or any combination thereof. Other equivalent metals and alloys may be envisaged as well.

In one embodiment, the castable material is a semiconductor, including silicon, or germanium, or gallium arsenide, or titanium dioxide, and their alloys or a combination thereof. Other equivalent semiconductors and alloys may be envisaged as well.

In one embodiment, the process includes heating the substrate before infiltration to a temperature that exceeds the castable material melting temperature.

In one embodiment, the castable material is directionally solidified so as to prevent the presence of shrinkage cavities within the solidified castable material.

In one embodiment, the substrate is placed in vacuum before infiltration with the castable material.

In one embodiment, the process includes a removal of substrate material so as to create shaped castings out of the castable material.

In one embodiment, the substrate material is removed by chemical means such as by an immersion in a solution that etches the substrate material but not the metal. Other means may include sublimation of the substrate, its evaporation by interaction with a reactive gas phase as in the Reactive Ion Etching ("RIE") process, or its transformation into a liquid by diffusive combination with another material or fluid.

In one embodiment, the substrate material is removed by mechanical means, for example by shattering the transparent material followed by removal of debris by mechanical means, as is done in conventional foundry demolding processes, or using combinations of chemical and mechanical means, as in the Chemical-Mechanical Planarization process used in the IC-semiconductor industry, In one embodiment, cavities or precracks are produced in the substrate to ease release from the host substrate of the solidified infiltrated castable material.

In one embodiment of the process, after the exposed substrate has been etched to form a first network of cavities, the substrate is exposed again to focused laser irradiation at a preselected series of locations that will be etched after the castable material has been infiltrated and solidified, thereby forming one or several networks of channels around which the castable material may create electric or magnetic fields.

In one embodiment, the invention relates to a product comprising at least a substrate and a castable material wherein the product is obtained by a process according to the present invention.

In one embodiment, the obtained product is a micromechanical component with flexible elements, or a component for watches (such as a gear, an escapement, a spring, a needle or another part), or an implant, or a microheater, or a battery structure or an ornament for jewelry. Other products of similar sizes and construction may of course be envisaged in the frame of the present invention and obtained by the method and process according to the present invention.

In one embodiment, the obtained product may be a microfluidic structure.

In one embodiment, the obtained product may contain an electrolyte.

In one embodiment, the product obtained by the method according to the present invention comprises a regular array of metal elements.

In one embodiment, the obtained product comprises a watch cover with at least one embedded metal numeral or a plurality thereof.

DETAILED DESCRIPTION OF THE INVENTION

The present invention will be better understood by the description of several embodiments thereof and appended drawings which show:

The process according to the present invention is described hereunder by means of examples; these, however, are illustrative and are not meant to be limitative, given that the process may be used with any combination of materials that each belong to one of the two following classes:

(i) a material (designated hereafter as the "substrate") that is transparent to laser radiation and reacts to such radiation when the instant power is sufficiently intense to trigger non-linear absorption effects in ways that can be used to produce a shaped cavity in its midst (with or without secondary processing steps such as annealing and/or etching);

(ii) a second material (designated hereafter as the "castable material") having its melting point below that of the substrate and that does not display excessive chemical reactivity with the substrate at all processing or service temperatures.

Generally the process will combine two or more such materials according to embodiments of the present invention. Indeed, it is possible to combine a substrate with one or several different castable materials, by successive infiltration with various castable materials having decreasing melting temperatures.

In some embodiments, the process may also provide structures featuring several substrates, which are produced separately and then combined during pressure infiltration with a castable material or with several castable materials in accordance with possible embodiments of the present invention.

Furthermore, the process is also applicable to materials having embedded optical elements such as waveguides, Bragg-gratings, thermally-polled elements as well as nano-voids, as long as that the infiltration temperature remains below the temperature point where these elements might be degraded or disappear.

Figure 1:
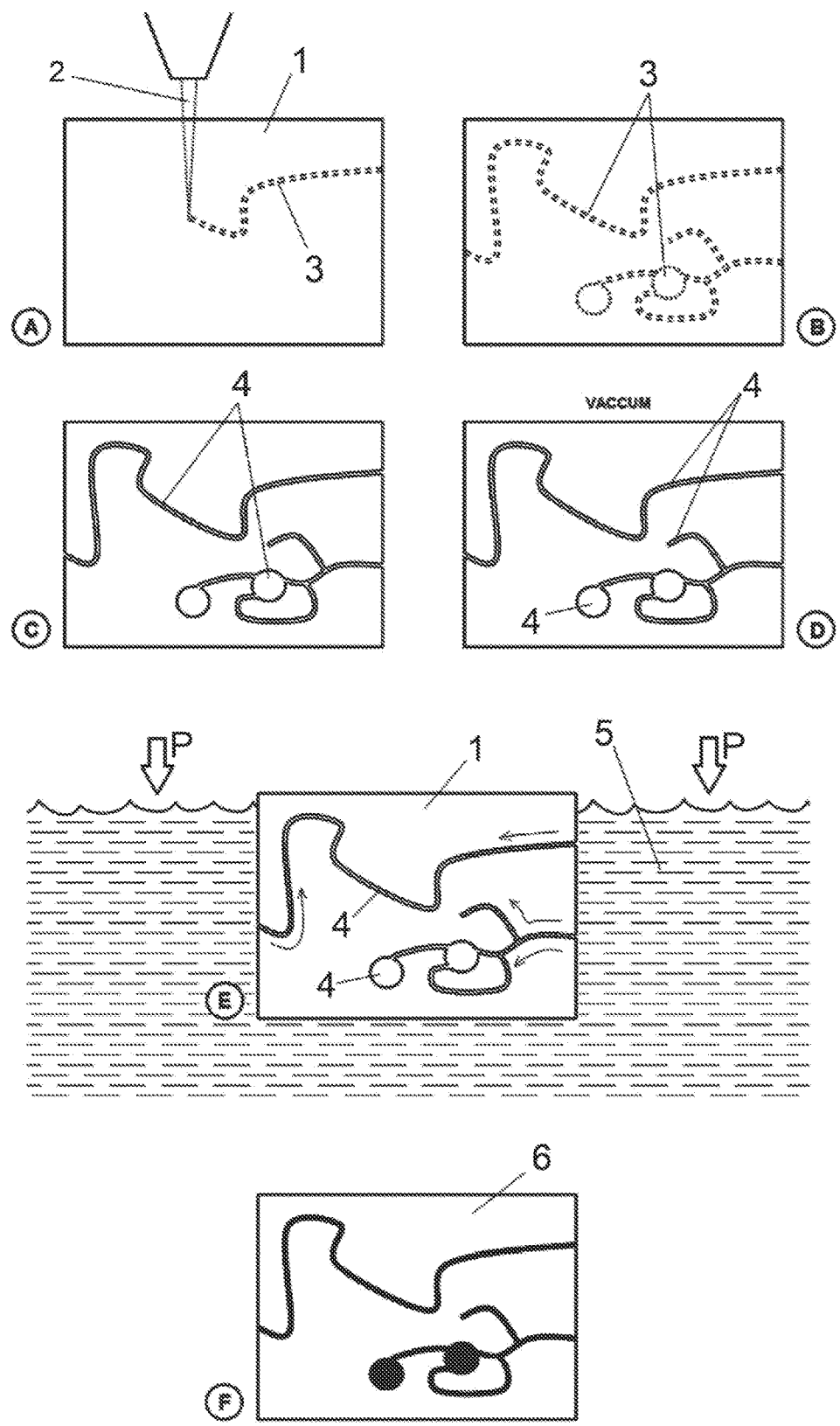
FIG. 1 illustrates the principle of an embodiment of the present invention.

FIG. 1 illustrates by means of a non-limitative example the process in its successive steps:

- A & B—a laser-transparent material/substrate 1 is exposed to ultrashort (for example in the femtosecond range) laser irradiation in preprogrammed geometrical locations 3 by scanning the laser beam 2 in the volume or along the surface of the material
- C—at those irradiated locations 3, selective etching (or another selective material removal process as described earlier) turns the irradiated material into a cavity or several cavities 4
- D—the substrate 1 with its cavity or cavities 4 is preferably placed in vacuum or within an atmosphere that is absorbed or sufficiently compressed by the castable material to prevent substantial gas being trapped in the cavity or cavities and avoid bubbles remaining in them; optionally the substrate may also be heated
- E—in this vacuum or atmosphere the substrate is made to contact molten castable material 5 such that the latter contacts all points where a cavity reaches the surface of the solid substrate. The molten castable material 5 is then exposed to an atmosphere or contacted by a mechanical device that brings it to a pressure sufficient to cause it to penetrate and fill the formed cavity or cavities 4 within the substrate 1;
- F—The castable material is solidified, creating a composite structure 6 of two materials intimately combined along a pre-determined geometrical pattern.

The processes and structures that may be produced using the principles and embodiments of the present invention are now illustrated by means of several examples; these examples or embodiments of the present invention providing inter alia a process for producing microscopic structures of glass containing channels filled with engineering metals such as copper, silver or their alloys and structures or products made by the said process as described hereunder.

EXAMPLE 1

A fused silica substrate was exposed to a femtosecond laser to define various cavities in said substrate, including U-shape cavities, blind cavities forming a candelabra with three arms of different sizes, or simple blind cavities combined with laser affected zones. The exposed regions were dissolved in hydrofluoric acid (5%) for several hours.

Figure 2:
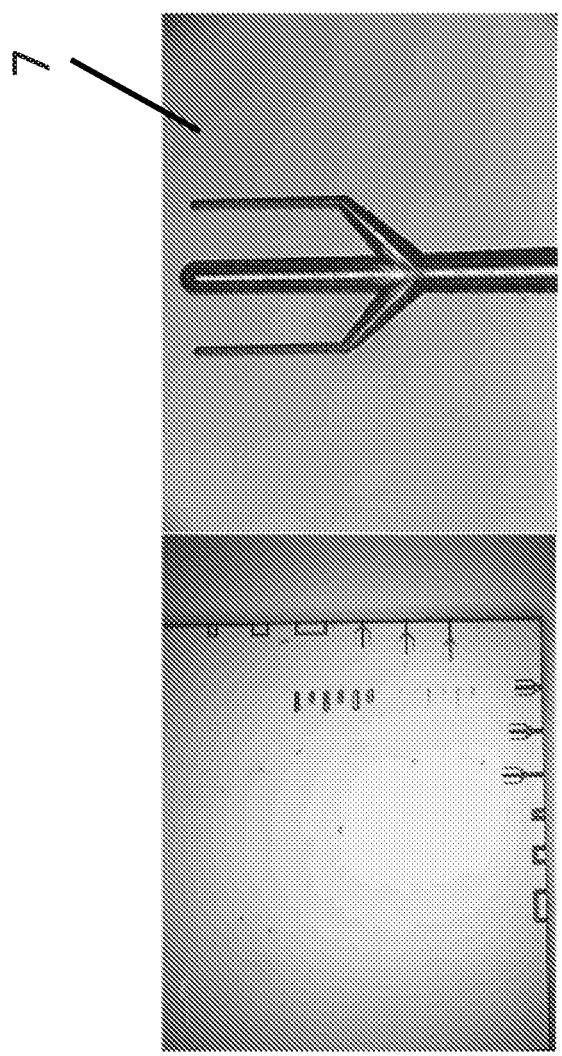
FIG. 2 shows a patterned glass before pressure infiltration at two different magnifications.

The patterned etched glass sample, which is shown in FIG. 2, was then placed next to pieces of pure copper in a crucible, that was itself placed within a laboratory apparatus that can be either evacuated or filled with pressurized gas and that comprises an induction heater. Within the apparatus, the crucible and its contents were first evacuated using a vacuum pump, and heated by means of induction heating to a temperature above the metal melting point (1110° C.), whereupon the metal melted, surrounding the carved glass sample and thus sealing it from the surrounding atmosphere. The metal was then pressurized to 5 MPa by letting argon gas into the pressure infiltration apparatus main chamber. This forced the molten metal into the small evacuated cavities. The heater was then turned off, such that the metal infiltrated in the glass was solidified under pressure, leaving a solid structure 7 that could be retrieved from the surrounding metal.

Figure 3:
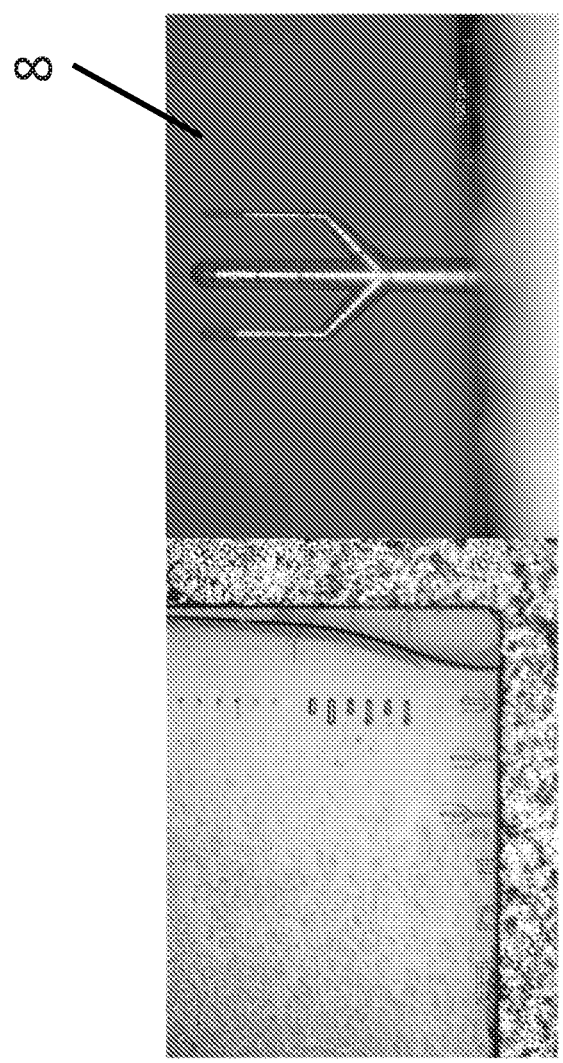
FIG. 3 shows a patterned glass after infiltration with copper at two different magnifications.
Figure 4:
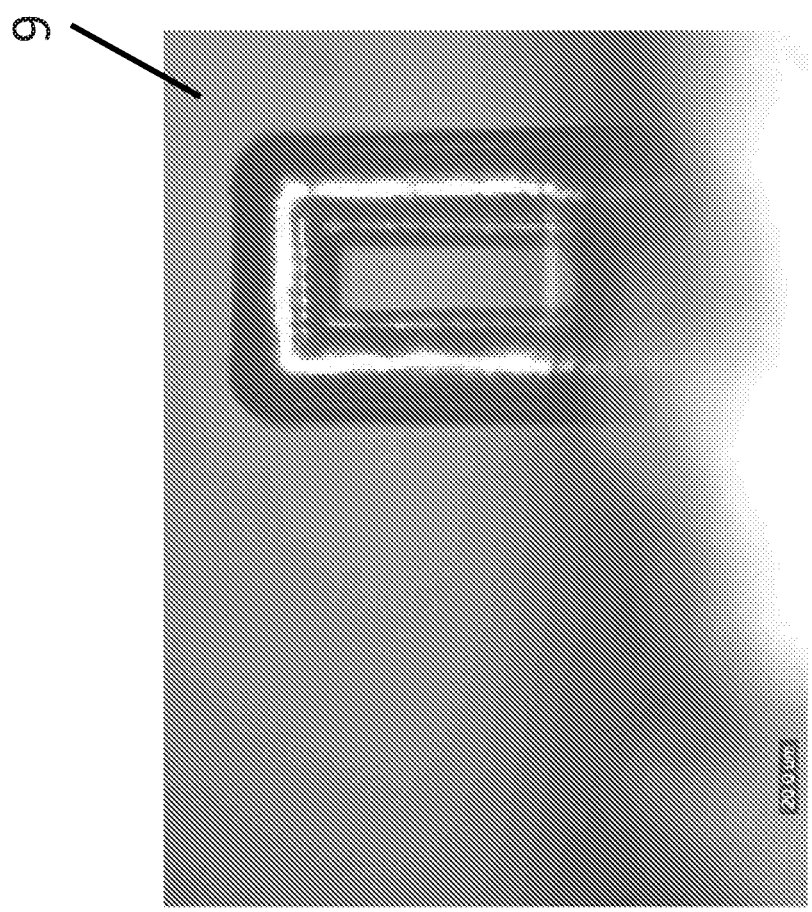
FIG. 4 shows a close-up of a copper-filled cavity within the glass.

FIGS. 3 and 4 illustrate examples of products 8, 9 obtained by a process according to the present invention, which is a combination of metal filling accurately the preshaped fine-scale cavities that had previously been carved within the glass. As seen the metal penetrated cavities the diameter of which was only a few micrometers wide, and the aspect ratio of which was well above unity.

EXAMPLE 2

Figure 5:
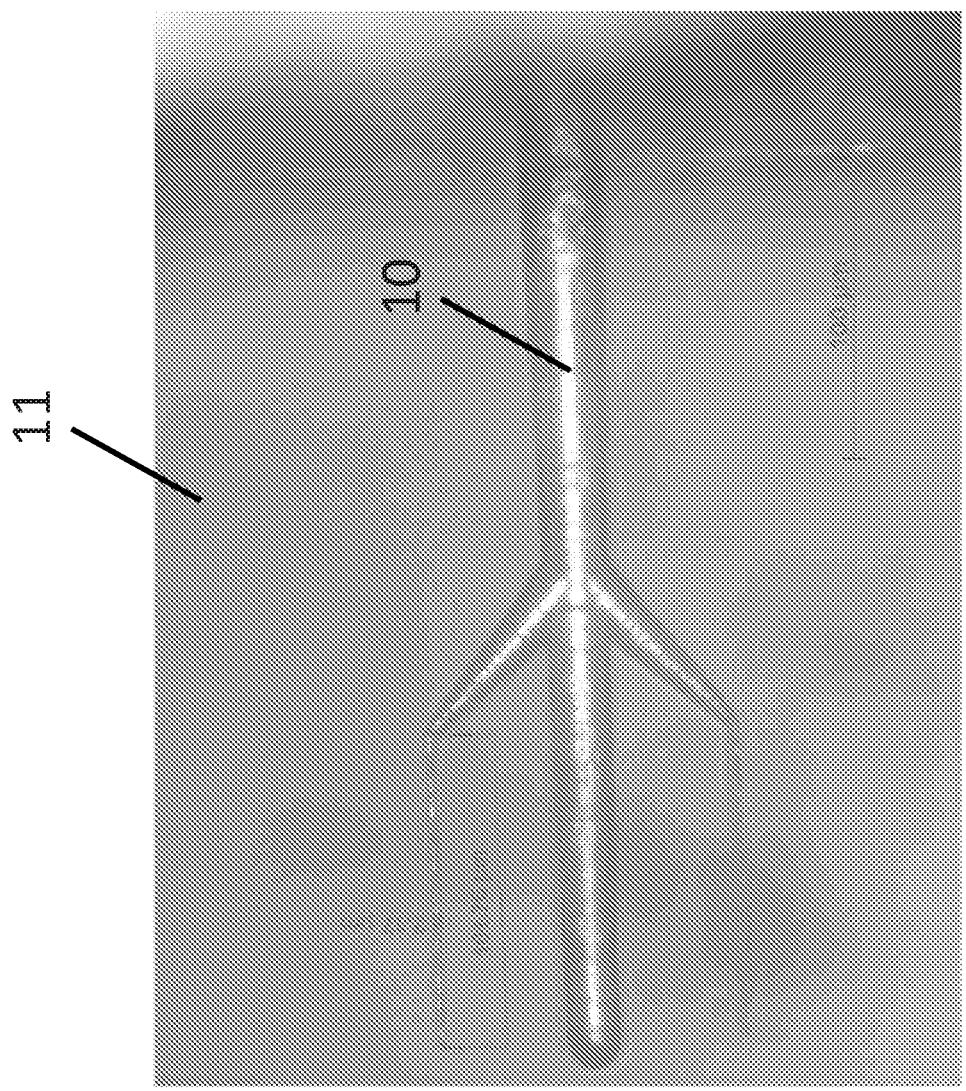
FIG. 5 shows a close-up of a 61% copper and 39% silver alloy filled cavity within glass.
Figure 6:
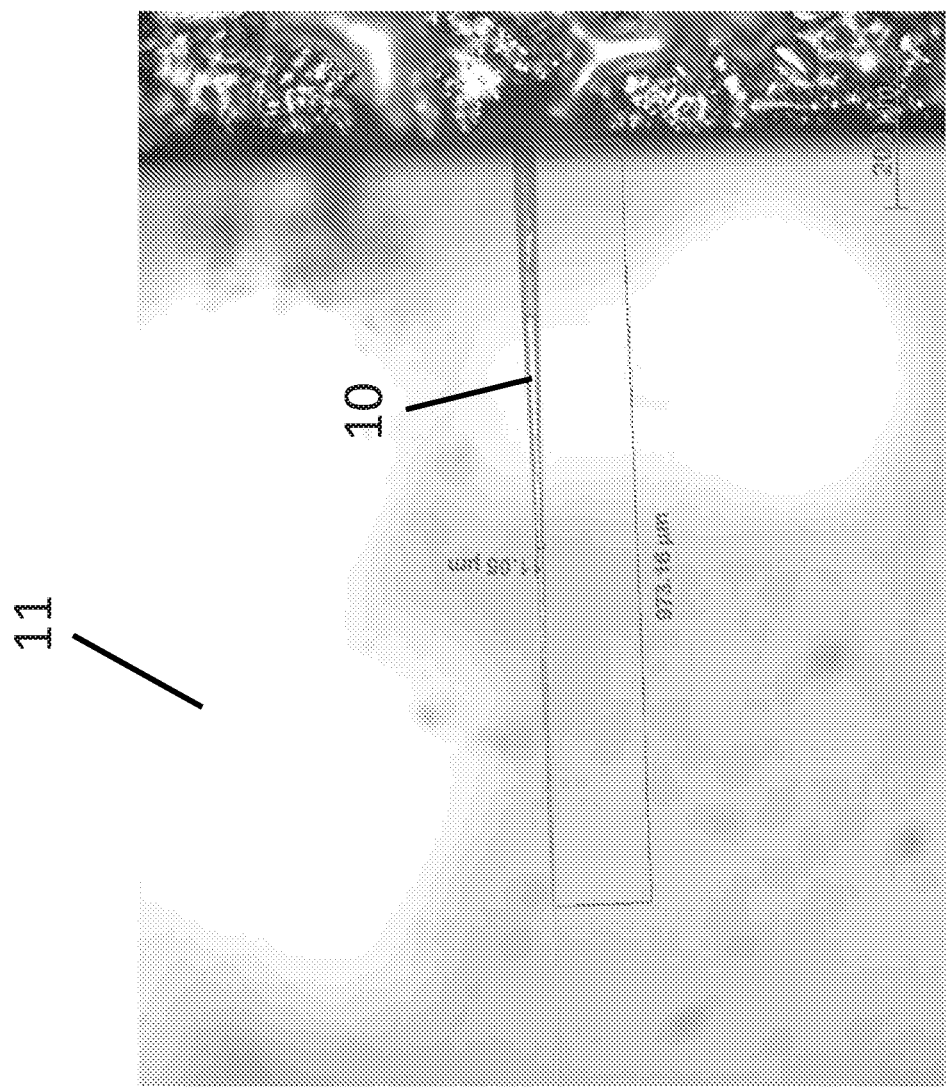
FIG. 6 shows a close-up of a 61% copper and 39% silver alloy filled high aspect ratio and fine diameter cavity within glass.

It became evident, after infiltration with pure copper, that the glass tends to devitrify to an extent that increases with the pressure infiltration temperature; it was further determined using Raman spectroscopy that devitrification led to the formation of cristobalite crystals. While such devitrification might in some cases be useful, we also succeeded in preventing this while leaving good conductive properties to the metal within the glass, by using an alloy of copper with silver and the same infiltration pressure. The result is illustrated in FIGS. 5 and 6, showing metal 10 espousing accurately the cavity that was created within a glass 11 that had not devitrified after infiltration at the lower temperature of 870° C. made possible by alloying. In FIGS. 5 and 6, the alloy used is made of 61% copper and 39% silver, as an example.

EXAMPLE 3

Figure 7:
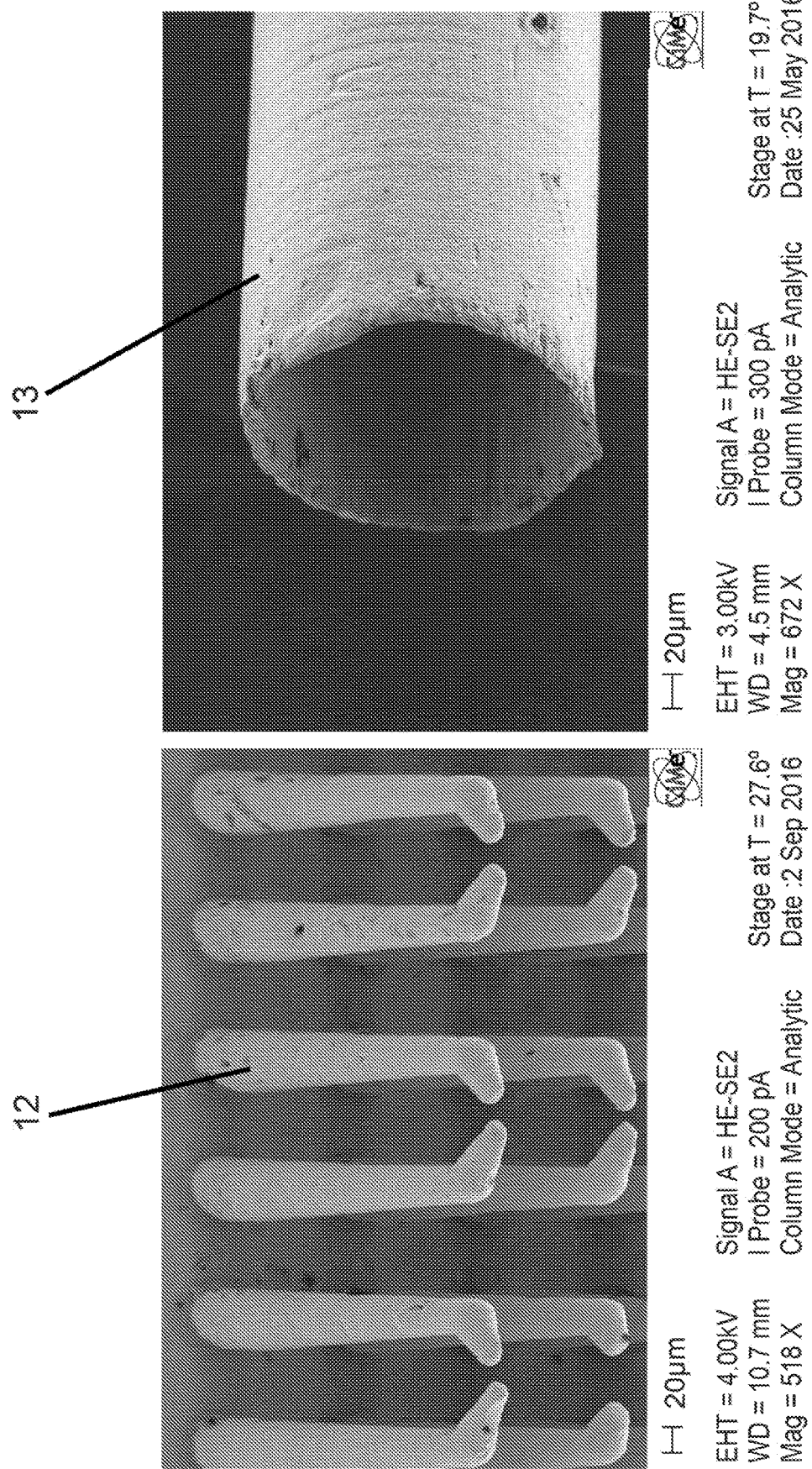
FIG. 7 shows a close-up of pure silver structures exposed after leaching the substrate material.

Structures combining fused silica substrates containing cavities and pure silver (melting point of 962° C.) have also been achieved using the process disclosed in the present invention. The same process and apparatus as in Example 1 were used. The infiltration chamber was evacuated using a vacuum pump and heated up to 1000° C. with an induction heater. The chamber was then pressurized with argon up to 4 MPa. Heating was stopped and gas pressure was maintained during cooling. After infiltration and solidification of the metal, the glass substrate was leached using hydrofluoric acid, to leave tiny shaped castings of pure silver. FIG. 7 shows two different geometries of pure silver 12, 13 that were produced by the process disclosed here; note the fact that the process also enables the production of hollow metal components.

EXAMPLE 4

Figure 8:
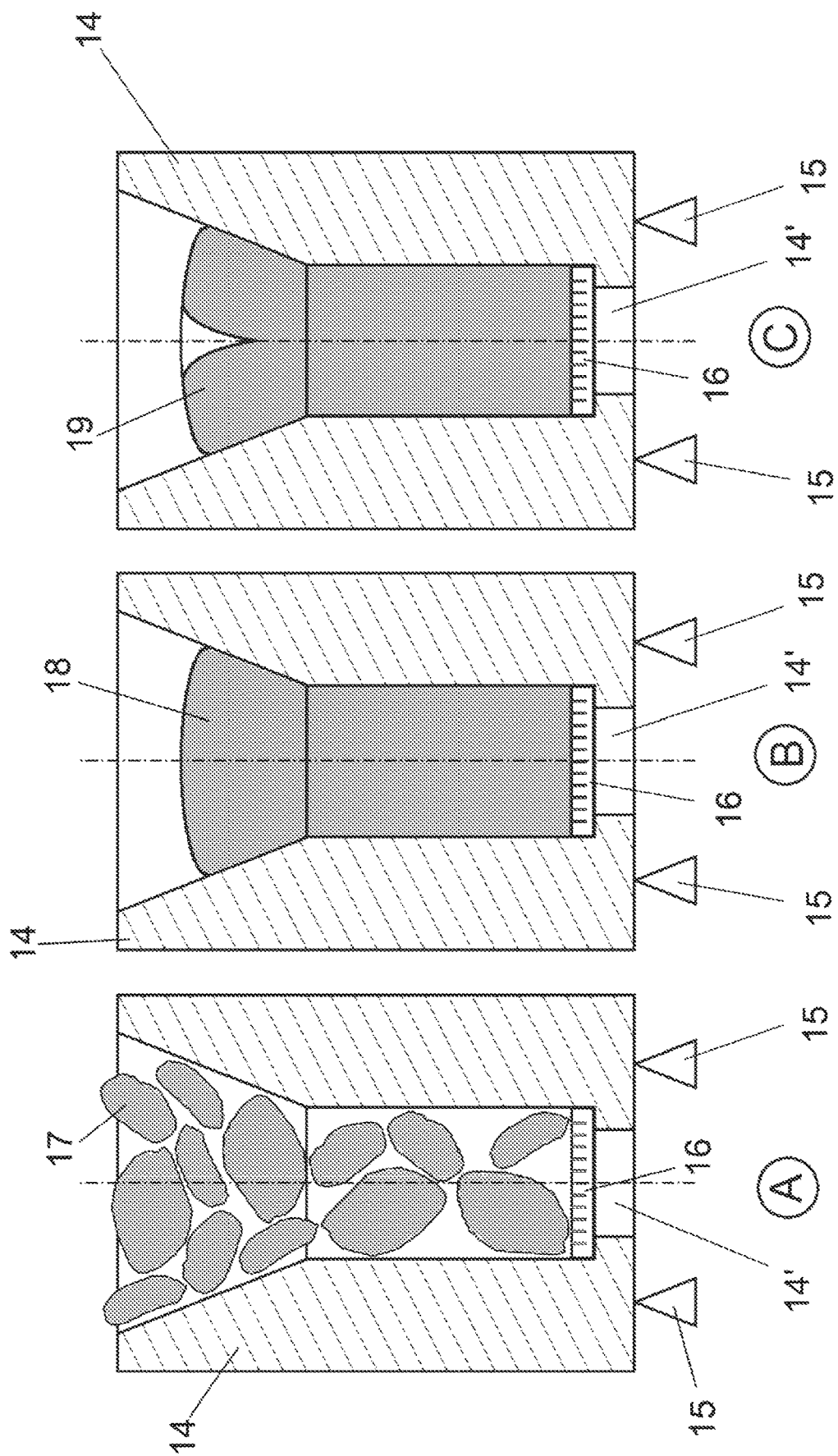
FIG. 8 illustrates the embodiment of the process described in Example 4.

A flat and smooth substrate of fused silica containing preshaped hollow cavities was prepared by means of the same process as that described in Example 1. It was then placed, with the entrances to hollows that had been carved into the substrate facing upwards, at the bottom of a graphite crucible, resting along a shoulder near the bottom of the crucible, with the lower part of the substrate exposed to the surrounding atmosphere. Note that the graphite crucible can be made of low-grade porous graphite, or of another material such as porous sand, because (unlike what is practiced in the infiltration processing of metal matrix composites) it is not needed that it be gas-tight. The crucible was filled up with pure silver granulates and was then placed inside the same apparatus as was used in Example 1. The chamber was evacuated using a vacuum pump and heated up to 1000° C. with an induction heater. The chamber was then pressurized with argon up to 1.5 MPa. Heating was stopped and the applied gas pressure was maintained during cooling to ambient temperature. FIG. 8 illustrates the crucible geometry used in order to induce directional solidification from the bottom of the substrate upwards toward the melt pool above it, so as to suppress the solidification shrinkage in the infiltrated substrate.

It is important to note how the pressure differential that drives the metal into the hollow within the substrate is maintained once the infiltration chamber is pressurized: this is achieved by having liquid metal meniscuses initially create a seal along the flat ring of smooth substrate surface that surrounds the entrance to each drilled shaped hollow within the substrate. By virtue of this seal geometry, it is unnecessary that the metal entirely surrounds the substrate, or that an air-tight crucible be used (those features being necessary when making, for example, a metal matrix composite). This feature of the process disclosed here makes it possible to (i) use low-cost porous materials as crucibles and (ii) to expose the lower end of the substrate directly to the surrounding atmosphere. The latter features, in turn, make it possible to cool the metal-infiltrated structure, at an opportune moment, along its lower surface so as to induce directional solidification in the direction appropriate for the feeding of solidification shrinkage. Cooling can be achieved by various means; in the present example cold pressurized gas contacts the substrate lower surface directly; in other versions of the process a copper chill could for example be made to contact that same lower surface.

The drawings in FIG. 8 detail steps in the process:

A—The substrate 16 is fit snugly at the bottom of the cylindrically symmetric porous graphite crucible 14, with its bottom surface 14' exposed to the open atmosphere so as to induce directional solidification from the bottom to the top. To this end, a hole is drilled into the crucible lower surface. The crucible is placed on elevated holders 15 so as to increase access of the surrounding atmosphere to the exposed substrate lower surface. Also, the amount of silver 17 exceeds substantially the volume of cavities to be filled: this increases the thermal mass atop the substrate and creates favorable conditions for the elimination of solidification shrinkage within the infiltrated substrate cavities.

B—The filled crucible is placed within a chamber, which is heated up under vacuum, melting the silver. Sealing of the hollow cavities with respect to the surrounding atmosphere is produced by having the liquid metal 18 meniscus initially run against the substrate along the perimeter of smooth flat substrate material surrounding the entrance into each shaped carved substrate cavity. As a result, once gas pressure is applied, it pushes the metal to infiltrate all cavities of the substrate.

C—Gas pressure is maintained during cooling, while silver solidifies vertically upwards, concentrating solidification shrinkage at the top of the silver ingot 19.

Figure 9:
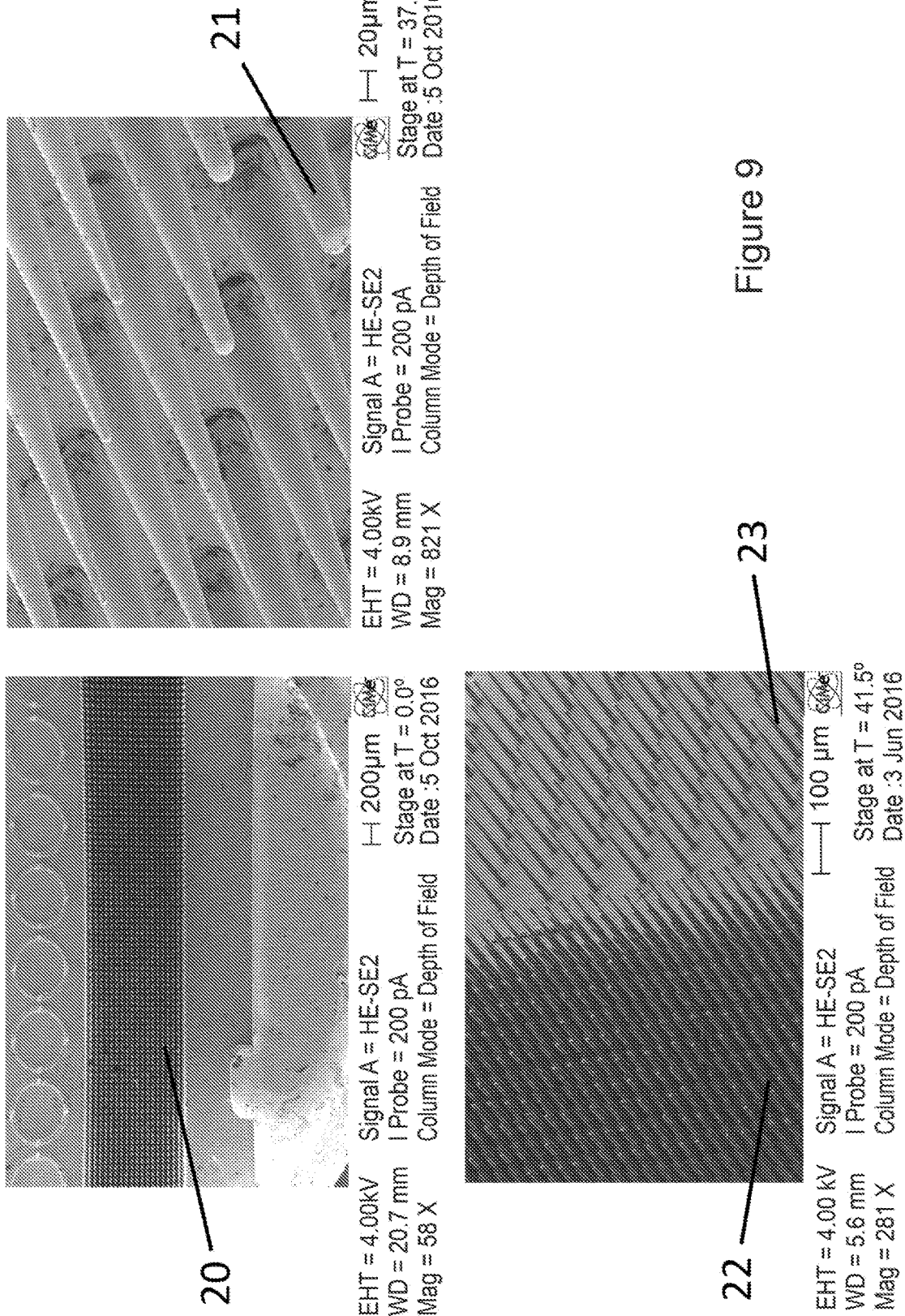
FIG. 9 shows a close-up of pure silver structures produced by the embodiment of the process described in Example 4.

FIG. 9 shows silver parts 20, 21, 22, 23 achieved with this process and exposed after chemical dissolution of the substrate. Note the fine scale and the reproducibility of the many thin metal features thus created.

Examples of Applications

The usefulness of the process according to the present invention is in that it enables the rapid production of a wide range of new devices and structures.

In one application of the process, the glass substrate is removed after infiltration and solidification of the castable material using an etchant to which the castable material is not sensitive (such as dilute HF for copper or silver) or by mechanical means for example as described herein. The end result is a metal casting of very fine scale, produced to essentially any shape.

Figure 10:
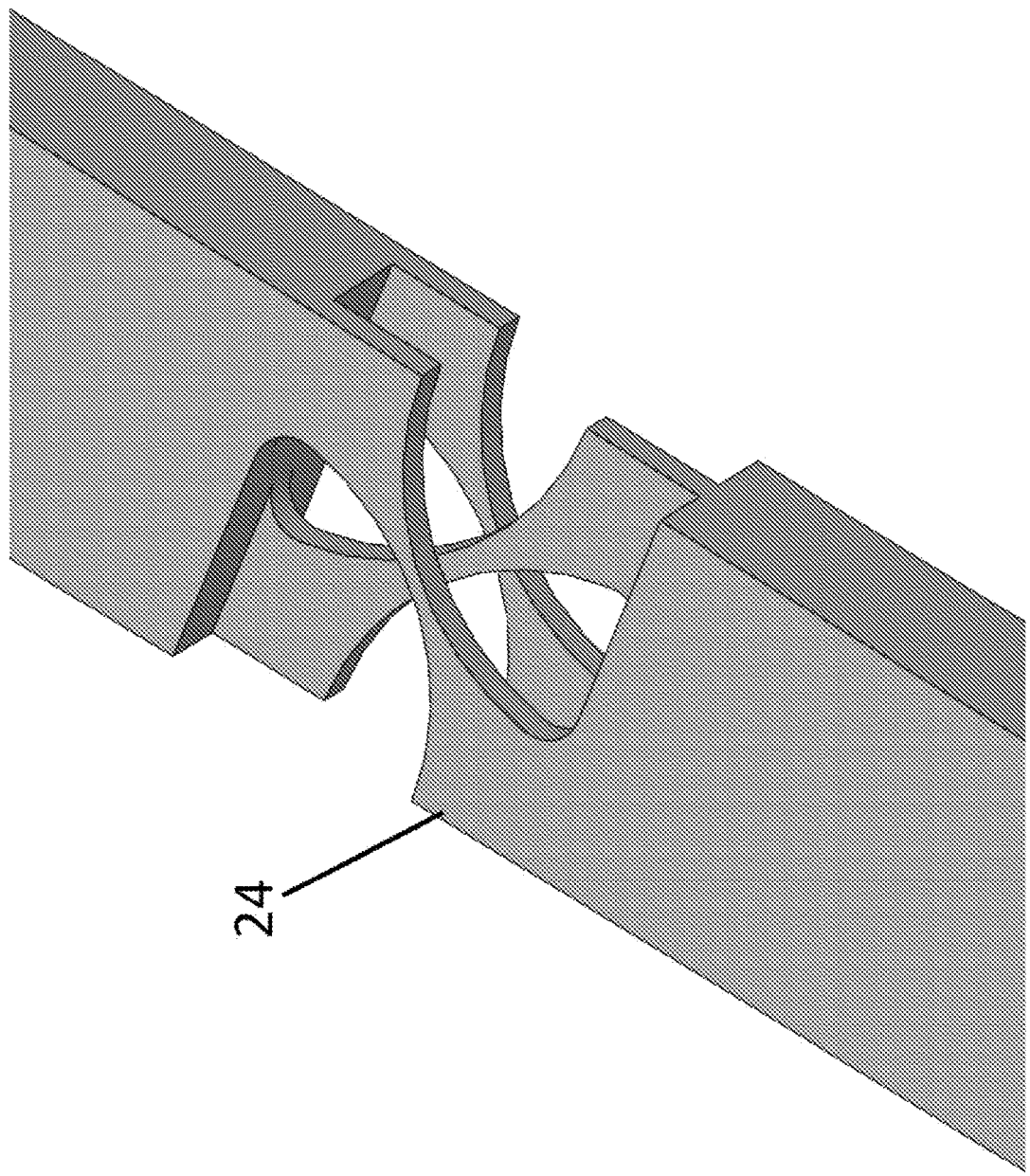
FIG. 10 is an illustration of an example of a complex microcast metal part that can be produced by the present invention out of engineering metals such as copper, silver, gold or their alloys.

FIG. 10 gives an illustration of a structure 24 that can be produced using the process taught herein; it has a shape that would be hard, or impossible, to produce using thin film or micromachining processes. Such components 24 may be of use in precision mechanics or microelectromechanical systems (MEMS) applications.

Figure 11:
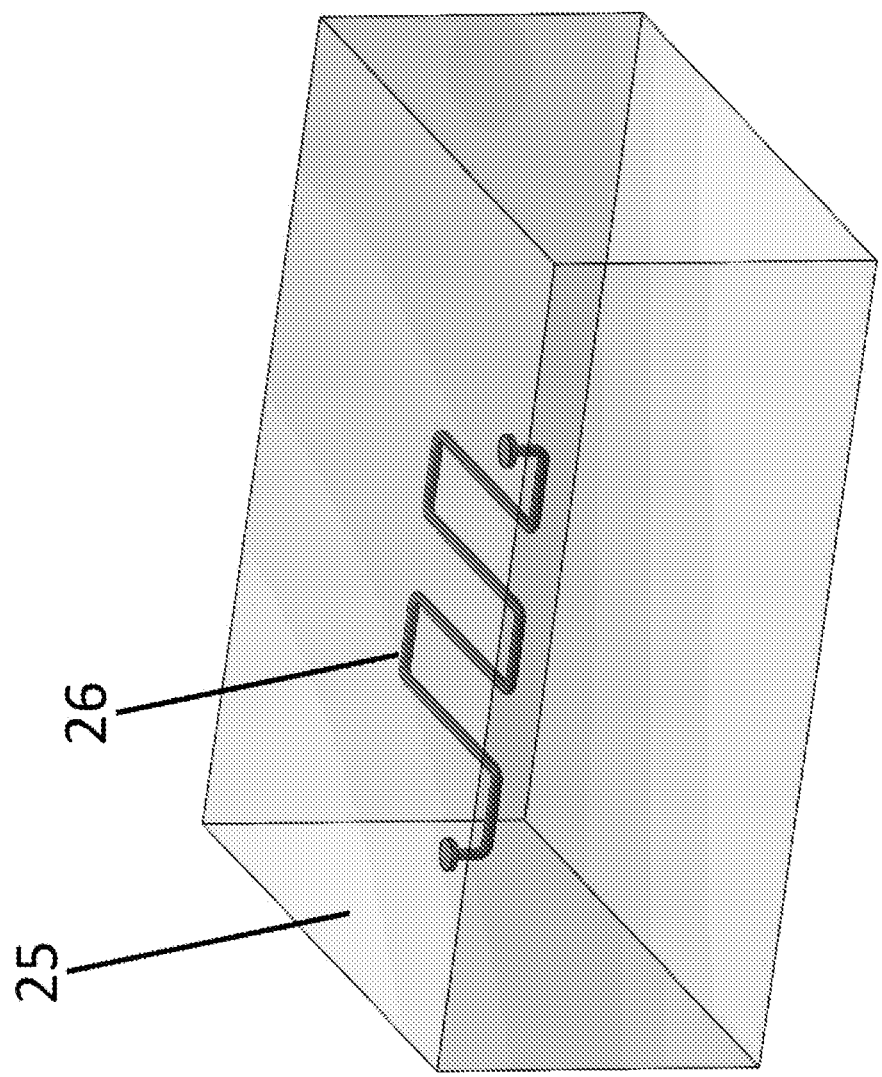
FIG. 11 is an illustration of an example of a microheater that can be produced by the present invention.

The invention may be used to produce micro-heaters for chemical microreactors, by following the steps detailed above. This embodiment is schematically illustrated in FIG. 11. If surrounding solidified castable material is left in contact with the substrate 25 by not removing the former, then the metal heater 26 may be fully embedded in glass or another inert dielectric, further protecting it from possible corrosion/degradation that may occur in contact with chemicals. Such micro-heaters may for instance be used to construct an instrument that performs micro-differential scanning calorimetry of high precision and works in high-temperature conditions (fused silica is chemically inert to most chemicals other than HF or KOH).

Another example of application of the process as described above is in the production of microfluidic structures with functional channels, containing actuators or sensors that rely on the passage of electric current or light or any other equivalent detectable means suitable to make measures in such a microfluidic structure. The process can also be used to add denser transparent material in cavities nearby the microfluidic structures. These denser transparent material can further used a waveguide or as an optically active element such as an amplification medium. To produce structures of this type, Steps described in Examples 1 and 2 above may be combined with a third step in which a new set of channels are carved and left vacant, leaving a network of channels around which the conducting metal creates electric or magnetic fields that influence or sense passing fluids or slurries. In this example, these additional structures—which are not to be infiltrated with metal—can be exposed to laser irradiation at the same time as the volume to be infiltrated: as long as they do not connect to the substrate surface during the first etching step that carved out the volumes to be infiltrated, those closed volumes will not be infiltrated and can be etched later in the process. Charged particles can thus be sensed or deviated, as can magnetic particles; alternatively, the embedded metal can contact the passing fluid directly, sensing or causing electrochemical reactions. The same principles may be applied with light detection or other techniques applicable in microfluidic structures.

Figure 12:
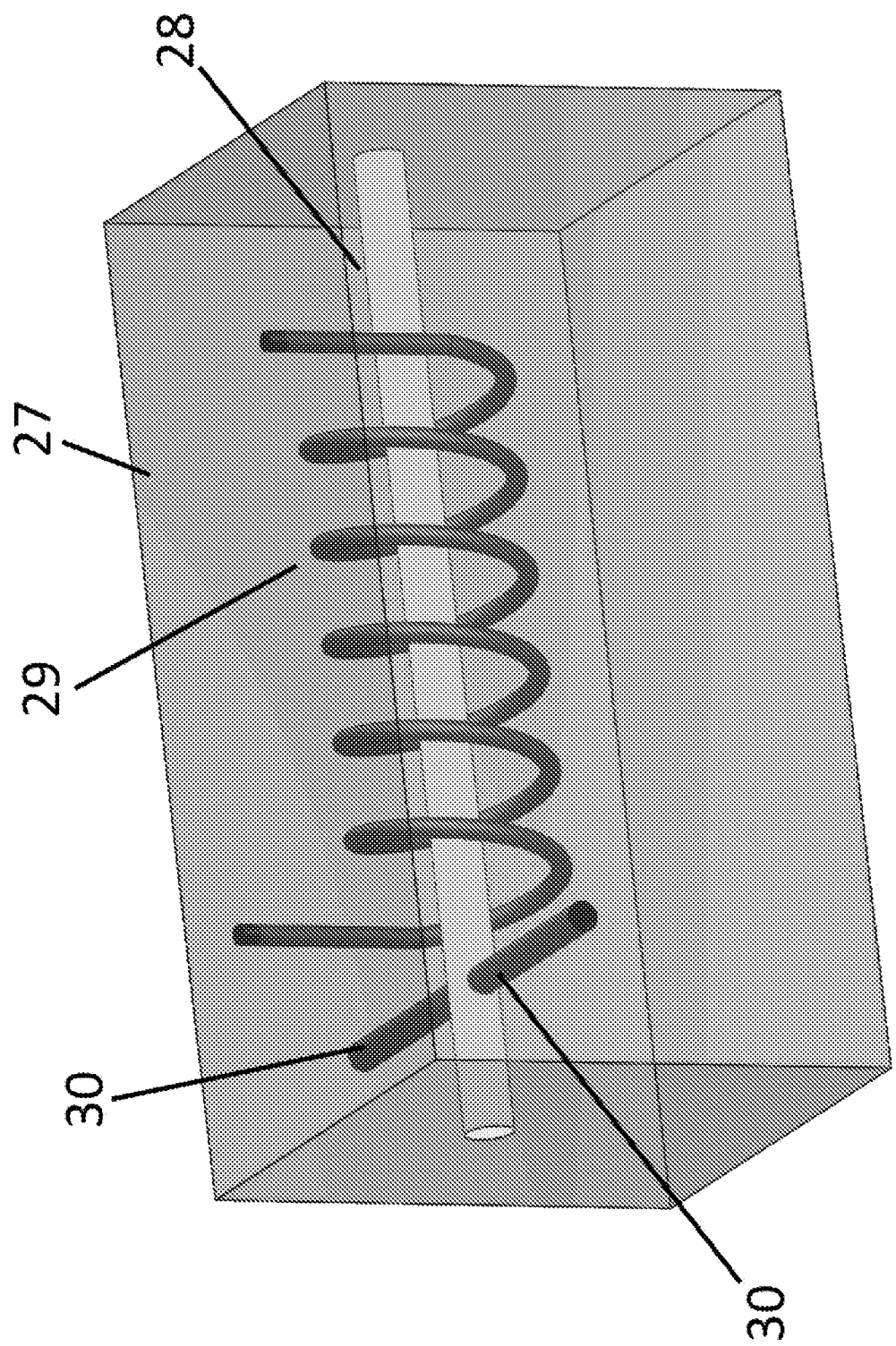
FIG. 12 is an illustration of an example of a microfluidic device that can be produced by the present invention, for example out of glass and copper, in which a channel is surrounded by a metal coil and flows past two electrodes.

FIG. 12 gives an illustration of such a microfluidic structure 27, in which a channel 28 is surrounded with a metal coil 29 and flows past two straight electrodes 30, also of metal.

In the field of energy storage, structures produced by the present invention may be used to produce capacitive or energy-storing battery structures, including so-called supercapacitors The reason for this is that the present invention may combine conductive materials, highly dielectric materials such as glass, and fluid-containing cavities or porous structures that may be formed by ultrafast (such as femtosecond) lasers working in the regime where nanogratings are formed in the substrate material, all of microscopic dimensions and arbitrary geometry.

Figure 13:
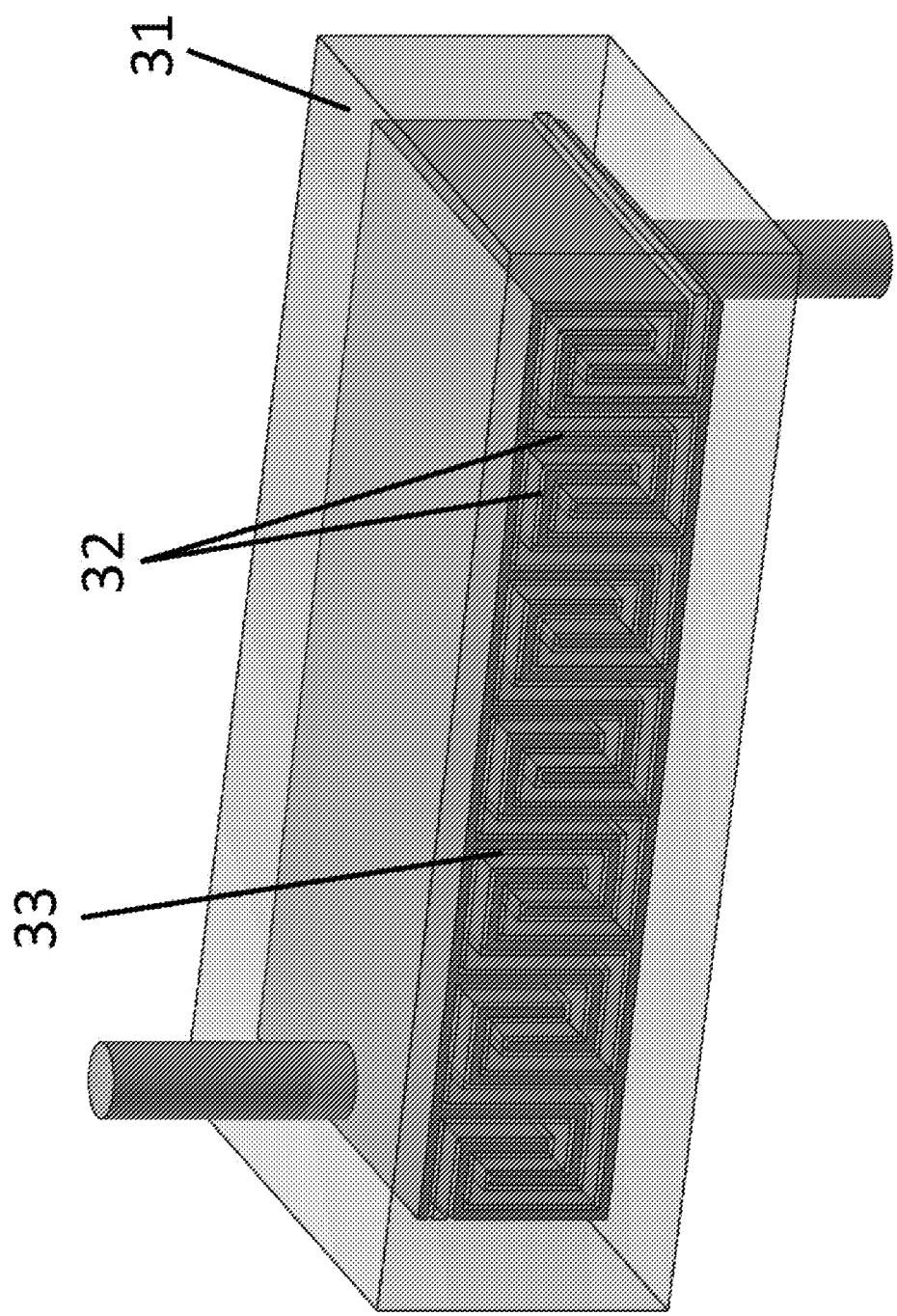
FIG. 13 is an illustration of an example of a capacitive device in which two shaped metal electrodes are separated by an electrolyte-filled nanoporous glass.

FIG. 13 illustrates such an energy storage structure 31 and how it is produced: large channels 32 are produced and etched to be filled with metal, forming two electrodes. The space between them 33 is made nanoporous using laser nanograting, and in a final step the nanopores are filled with an appropriate, glass-wetting electrolyte to form structures such as supercapacitors. Note that the castable material can also be made nanoporous if composed of a metal alloy subject to dealloying by exposure to an appropriate etchant.

Other examples of applications that can be produced by directly applying processing steps disclosed above are:

In the field of electro-optics, where conductive paths can be used to induce polling effect in the glass material, to introduce non-linear properties (such as $\chi 2$) in the glass response to high-field intensity.

In the field of medical devices. Thanks to the flexibility of the three-dimensional printing offered by ultrafast (such as femtosecond) laser exposure, custom-made surgical implants may be cast into glass substrates. The resulting implants may be made of various bio-compatible and castable alloys, including Nitinol Nickel™-Titanium shape memory alloys among other options. Among possible implants are dental implants, bone grafts, scaffold, stents as well as specialized surgical and dental tools (root-canal drills).

In the field of integrated lasers. Cavities may be filled up with a high refractive index glass such as Tellurite glass, itself doped with ions such as rare-earth ions, for example of Neodymium or Ytterbium, to form an active medium for a laser cavity. The high refractive index glass (typically n>2) may further be used as waveguide capable of short bending angles.

In the field of X-ray optics, complex shapes to focus X-ray beams through internal reflections may be produced using concentric three-dimensional cavities filled up with metal such as gold and produced by the present invention. These types of optics require high aspect ratios that can only with difficulty be produced with traditional means. The host substrate could be kept (glass is fairly transparent to X-ray in particular) or dissolved.

In the field of high-power and/or high frequency electronics, if the process described here is combined with a chemical metal planarization process (so called CMP, common in the semi-conductor industry), this process may be advantageously used to create intricate copper interconnects with high current, high voltage capacity thanks to the use of fused silica in particular as host substrate (fused silica has a high field strength resistance (typically 20-40 V/μm, ranking among the highest available in durable materials).

In the field of microactuators, the process described here may be used as described above to form surface acoustic wave generators. Fused silica has a high-Q factor that allows for the propagation of quasi-undamped surface acoustic waves. Infiltrated parallel electrodes near the device surface may be used to create the source waves. More generally, the process may be combined with micromechanical structures (references 24-26 give some first illustrations of MEMS sensor and actuators fabricated using femtosecond laser processing). The ability to infiltrate cavities, as taught above, to form electrodes expands the design space for such devices, by removing the need for deposition processes, which require masking the device and are limited to surface electrodes.

For miniaturized ion traps, cavities filled with metals infiltrated successively and forming electrodes for the generation of strong magnetic/electrostatic fields, together with waveguides for cooling atoms may be used to effectively confine atoms. Such ion traps can be used in miniaturized atomic clocks and drive new concepts for ultrasensitive sensors such as a quantum gravitometer.

Figure 14:
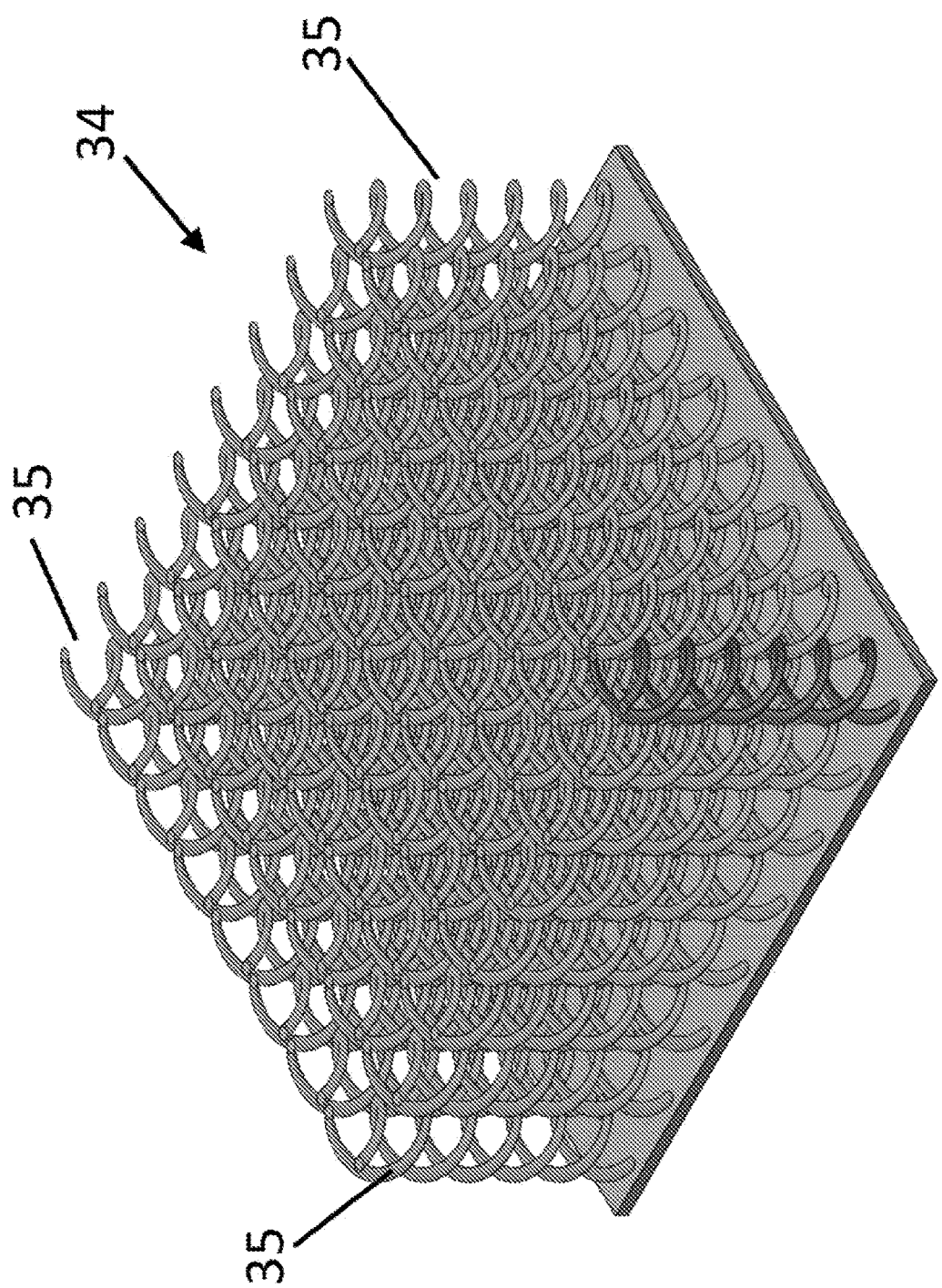
FIG. 14 is an illustration of an example of a metamaterial that can be produced by the present invention.

Fine-scale regular hollow structures of the castable material, including lattice-truss and metamaterials, can also efficiently be produced by means of the process herein disclosed; FIG. 14 illustrates an example of such a structure 34 comprising a regular array of helical metal elements 35, which can be produced rapidly and at fine scale by the present process.

Figure 15:
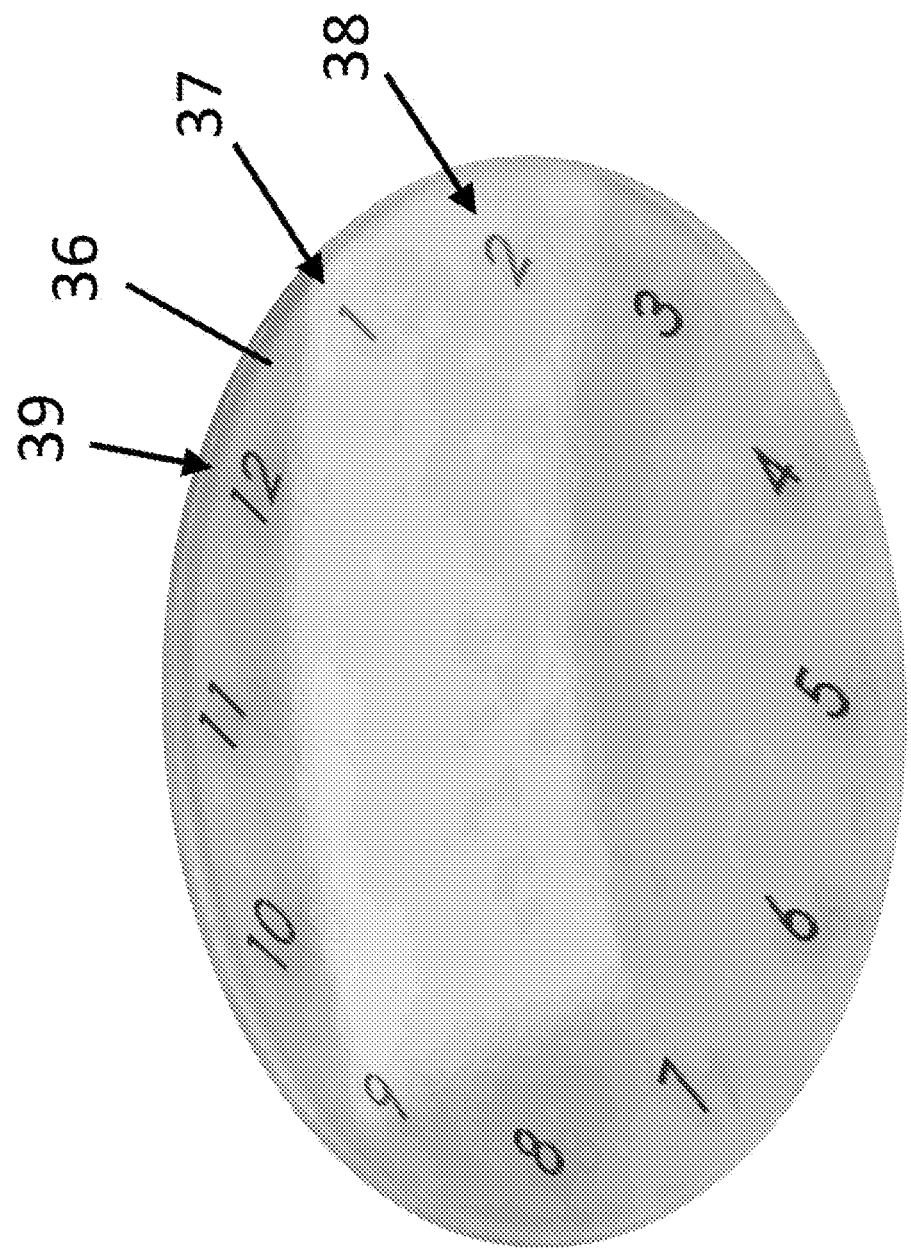
FIG. 15 is an illustration of an example of a watch cover containing metal numerals embedded within the glass produced by the process of the present invention.

Esthetic value can also be found in the materials and structure produced by the process disclosed here; for example one could produce using the present invention, with ease and versatility, a glass cover containing metallic dial numbers embedded in its midst, as illustrated in FIG. 15 which shows such a watch cover 36 containing metal numerals 37-39 embedded within the glass. This structure can be produced as described above, adding a final polishing step to increase the visual beauty and transparency of the structure. Other similar products may of course be produced with the process of the present invention as described herein.

Many other examples can be given; these are all made possible by the combined features of the process herein described, namely (i) nearly total freedom in the shape of connected cavities that may be created within the substrate free of interference from thermal grooving along grain boundaries with (ii) the very fine scale made possible by the use of pressure infiltration appropriately conducted. To gage how fine this scale can be, it suffices to remember that surface tensions reach values in the vicinity of one joule per square meter: pressuring the castable material to 10 MPa will, thus, cause it to penetrate cavities only 100 nanometres wide. Pressurizing it to 100 MPa, which can be delivered using a piston (in a squeeze casting apparatus, for example) will drive it to fill cavities only 10 nanometres wide. The range of structures and applications made possible by the present process is, thus, considerable.

The embodiments of the invention described in the present application are only illustrative examples and should not be construed in any limiting manner. The present invention may also use equivalent means and method steps to the ones described therein with corresponding results. Also many different applications of the present invention may be envisaged as suggested hereabove, all within the scope of the present invention. It is also possible to combine different embodiments of the present invention according to circumstances and they are not exclusive.

REFERENCES

[1] H. Shengguan, C. Feng, Y. Qing, L. Keyin, S. Chao, B. Hao, L. Hewei, M. Xiangwei, S. Jinhai, Z. Yulong, H. Xun, Journal of Micromechanics and Microengineering, 22 (2012) 105017.

[2] F. Chen, C. Shan, K. Liu, Q. Yang, X. Meng, S. He, J. Si, F. Yun, X. Hou, Opt. Lett., 38 (2013) 2911-2914.

[3] K. Liu, Q. Yang, Y. Zhao, F. Chen, C. Shan, X. Fan, X. Meng, G. Du, H. Bian, Micro & Nano Letters, 8 (2013) 623-628.

[4] K. Liu, Q. Yang, Y. Zhao, F. Chen, C. Shan, S. He, X. Fan, L. Ii, X. Meng, G. Du, H. Bian, Microelectronic Engineering, 113 (2014) 93-97.

[5] X. Meng, Q. Yang, F. Chen, C. Shan, K. Liu, X. Hou, Appl. Phys. A, 120 (2015) 669-674.

[6] X. Meng, Q. Yang, F. Chen, C. Shan, K. Liu, Y. Li, H. Bian, G. Du, X. Hou, "Fabrication of 3D solenoid microcoils in silica glass by femtosecond laser wet etch and microsolidics", The Int. Conf. on Photonics and Optical Engineering (icPOE 2014) Proc of SPIE, vol. 9449, pp. 9449N1-7, doi: 10.1117/12.2075880.

[7] A. Mortensen, Melt Infiltration of Metal Matrix Composites, Chapter 3.20, in: T. W. Clyne (Ed.) Comprehensive Composite Materials, Vol. 3: Metal Matrix Composites, Pergamon, Oxford UK, 2000, pp. 521-554.

[8] G. Baumeister, J. Haußelt, S. Rath, R. Ruprecht, Microcasting, in: D. Löhe, J. Haußelt (Eds.) Advanced Micro & Nanosystems Volume 4—Microengineering of Metals and Ceramics, Wiley-VCH, Weinheim, Germany, 2005, pp. 357-393. [9] C. Yang, B. Li, M. Ren, H. Fu, The International Journal of Advanced Manufacturing Technology, 46 (2010) 173-178.

[10] G. Baumeister, D. Buqezi-Ahmeti, J. Glaser, H. J. Ritzhaupt-Kleissl, Microsyst Technol, 17 (2011) 289-300.

[11] J. Rögner, K. H. Lang, G. Baumeister, V. Schulze, Microsyst Technol, 17 (2011) 301-311.

[12] I. Todor, B.-P. Andreas, V. Uwe, H. Claudia, H. Jens, G. Arnold, B. Kirsten, B. Nazlim, T. Sebastian, Journal of Micromechanics and Microengineering, 21 (2011) 085026.

[13] D. Buqezi-Ahmeti, J. Maisenbacher, J. Gibmeier, T. Hanemann, Microsyst Technol, 19 (2013) 159-165.

[14] Y. Bellouard, A. Said, M. Dugan, and P. Bado, "Fabrication of high-aspect ratio, micro-fluidic channels and tunnels using femtosecond laser pulses and chemical etching," Opt. Express 12, 2120-2129 (2004).

[15] S. Kiyama, S. Matsuo, S. Hashimoto, and Y. Morihira, "Examination of Etching Agent and Etching Mechanism on Femotosecond Laser Microfabrication of Channels Inside Vitreous Silica Substrates†," The Journal of Physical Chemistry C 113, 11560-11566 (2009).

[16] Y. Cheng, K. Sugioka, and K. Midorikawa, "Microfluidic laser embedded in glass by three-dimensional femtosecond laser microprocessing," Optics letters 29, 2007-2009 (2004).

[17] S. Matsuo, H. Sumi, S. Kiyama, T. Tomita, and S. Hashimoto, "Femtosecond laser-assisted etching of Pyrex glass with aqueous solution of KOH," Applied Surface Science 255, 9758-9760 (2009).

[18] S. Matsuo, "Femtosecond Laser-Assisted Etching of Fluoride Crystals," Journal of Laser Micro/Nanoengineering 6, 245-248 (2011).

[19] S. Juodkazis, Y. Nishi, and H. Misawa, "Femtosecond laser-assisted formation of channels in sapphire using KOH solution," physica status solidi (RRL)—Rapid Research Letters 2, 275-277 (2008).

[20] www.femtoprint.ch

[21] A. J. Hunt, "Nanomorphing with Ultrafast Lasers and Biomedical Applications," in MRS Proceedings (2011), Vol. 1365.

[22] Y. Liao, J. Song, E. Li, Y. Luo, Y. Shen, D. Chen, Y. Cheng, Z. Xu, K. Sugioka, and K. Midorikawa, "Rapid prototyping of three-dimensional microfluidic mixers in glass by femtosecond laser direct writing," Lab on a Chip 12, 746 (2012).

[23] R. D. Simmonds, P. S. Salter, A. Jesacher, and M. J. Booth, "Three dimensional laser microfabrication in diamond using a dual adaptive optics system," Optics Express 19, 24122 (2011).

[24] Y. Bellouard, A. Said, and P. Bado, "Integrating optics and micro-mechanics in a single substrate: a step toward monolithic integration in fused silica," Opt. Express 13, 6635-6644 (2005).

[25] B. Lenssen and Y. Bellouard, "Optically transparent glass micro-actuator fabricated by femtosecond laser exposure and chemical etching," Applied Physics Letters 101, 103503 (2012).

[26] T. Yang and Y. Bellouard, "Monolithic transparent 3D dielectrophoretic micro-actuator fabricated by femtosecond laser," Journal of Micromechanics and Microengineering 25, 105009 (2015).

[27] X. Meng, Q. Yang, F. Chen, C. Shan, K. Liu, Y. Li, H. Bian, J. Si, X. Hou, Optics and Laser Technology 76, 29-32 (2015).

[28] C. Shan, F. Chen, Q. Yang, Y. Li, H. Bian, J. Yong, and X. Hou, Opt. Lett. 40, 4050-4053 (2015)

The invention claimed is:

1. A method for casting a castable material in a substrate comprising the steps of:
   exposing the substrate to focused laser irradiation at a preselected series of locations to form a subset of a volume of the substrate connected to a surface of the substrate;
   removing a material from the exposed preselected series of locations of the substrate to create a cavity in the substrate that is connected to the surface of the substrate;
   immersing the cavity-containing substrate to an atmosphere that is configured to prevent trapping of gas and to avoid bubbles remaining in the cavity;
   contacting the surface of the cavity-containing substrate with molten castable material at locations where the cavity emerges from the substrate during the step of immersing, the substrate remaining solid at a melting temperature of the molten castable material;
   applying a pressure to the molten castable material to cause the molten castable material to infiltrate the cavity of the immersed cavity-containing substrate; and
   solidifying the castable material within the cavity of the substrate.

2. The method of claim 1, wherein the step of exposing the substrate to the focused laser irradiation includes at least one of a step of removing the volume of the substrate by laser ablation, a step of selective etching, and a step of flushing.

3. The method of claim 1, wherein the substrate includes an oxide glass with at least one of fused silica, borosilicate glass, aluminosilicate glass, tellurite glass, germanosilicate glass, a microporous glass, and a nanoporous glass.

4. The method of claim 1, wherein the substrate includes at least one of a laser-transparent crystalline and semi-crystalline ceramic.

5. The method of claim 4, wherein the semi-crystalline ceramic includes at least one of a sapphire, a ruby, a diamond, a nitride, a carbide, and silicon.

6. The method of claim 1, wherein the castable material includes at least one of a metal and a metal alloy.

7. The method of claim 1, wherein the castable material includes at least one of copper, silver, gold, platinum, palladium, aluminum, magnesium, zinc, tin, nickel, iron, titanium, and an alloy thereof.

8. The method of claim 1, wherein the castable material includes a semiconductor including at least one of silicon, germanium, gallium arsenide, titanium dioxide, and an alloy thereof.

9. The method of claim 1, further comprising the step of:

heating the substrate to a temperature that exceeds the melting temperature of the castable material, before the step of contacting.

10. The method of claim 1, wherein the step of solidifying further comprises the step of:

directionally solidifying the molten castable material to prevent a presence of shrinkage cavities within the castable material.

11. The method of claim 1, wherein the step of immersing is performed before the step of contacting.

12. The method of claim 1, further comprising the step of:

removing the material of the substrate to create a shaped casting of the castable material.

13. The method of claim 12, wherein the step of removing is performed by chemical etching the material of the substrate material but not the castable material.

14. The method of claim 13, wherein the step of removing is performed by mechanical means.

15. The method of claim 12, further comprising the step of:

producing at least one of additional cavities and precracks in the substrate to ease release of the solidified castable material from the substrate, before the step of removing.

16. The method of claim 12, further comprising the steps of:

after the step of exposing and removing, exposing the substrate again to focused laser irradiation at a second preselected series of locations for infiltration and solidification of the castable material, to form a network of channels around which the castable material creates at least one of electric and magnetic fields.

17. The method of claim 1, wherein the appropriate atmosphere includes at least one of a selected gas and a vacuum.

18. The method of claim 1, wherein a pressure applied in the step of applying the pressure is 1MPa or more.

19. The method of claim 1, wherein the step of applying the pressure is performed at least partially during the step of solidifying.

* * * * *